US011693266B2

(12) United States Patent
Gabler et al.

(10) Patent No.: US 11,693,266 B2
(45) Date of Patent: Jul. 4, 2023

(54) GLUE FREE FARADAY ISOLATOR (71) Applicant: QIOPTIQ PHOTONICS GMBH & CO. KG, Göttingen (DE)

(72) Inventors: Werner Harald Gabler, Munich (DE); Matthias Hans Lothar Anders, Dachau (DE); Claudia Gabler, Munich (DE)

(73) Assignee: Qioptiq Photonics GmbH & Co. KG, Göttingen (DE)

( * ) Notice: Subject to any disclaimer, the term of this patent is extended or adjusted under 35 U.S.C. 154(b) by 962 days.

(21) Appl. No.: 16/473,280

(22) PCT Filed: May 15, 2017

(86) PCT No.: PCT/US2017/032615
§ 371 (c)(1),
(2) Date: Jun. 25, 2019

(87) PCT Pub. No.: WO2018/212747
PCT Pub. Date: Nov. 22, 2018

(65) Prior Publication Data
US 2019/0317342 A1 Oct. 17, 2019

(51) Int. Cl.
*G02B 6/42* (2006.01)
*G02B 6/27* (2006.01)
(Continued)

(52) U.S. Cl.
CPC ............ *G02F 1/093* (2013.01); *G02B 6/4208* (2013.01); *G02B 7/00* (2013.01); *G02B 27/28* (2013.01); *H01S 3/0064* (2013.01)

(58) Field of Classification Search
CPC ............. G02B 6/42; G02B 7/00; G02B 27/28
(Continued)

(56) References Cited

U.S. PATENT DOCUMENTS 4,470,701 A * 9/1984 Smith ..................... H01S 3/083
359/484.02
5,715,080 A * 2/1998 Scerbak .................. G02F 1/093
359/484.04
(Continued)

FOREIGN PATENT DOCUMENTS

EP 1660931 8/2007
JP H09236784 A * 9/1997
(Continued)

OTHER PUBLICATIONS

International Search Report for PCT/US17/32615; dated Jan. 26, 2018.

*Primary Examiner* — Kaveh C Kianni
(74) *Attorney, Agent, or Firm* — Wolf, Greenfield & Sacks, P.C.

(57) ABSTRACT

A glueless optical device includes a housing having a first optical portal and a second optical portal opposite the first optical portal. A first optical component is within the housing adjacent to the first optical portal, and a second optical component is within the housing adjacent to the second optical portal. A central optical component is positioned within the housing between the first optical component and the second optical component. A first holder is configured to mount the first optical component to the housing via a first plate spring, and a second holder is configured to mount the second optical component to the housing via a second plate spring. A construct having a coil spring at least partially wrapped around a cylindrical crystal is configured to pass through a bore hole in the central optical component and mount the central optical component between the first holder and the second holder.

13 Claims, 9 Drawing Sheets (51) Int. Cl.
  *G02F 1/00* (2006.01)
  *G02F 1/09* (2006.01)
  *G02B 7/00* (2021.01)
  *G02B 27/28* (2006.01)
  *H01S 3/00* (2006.01)

(58) Field of Classification Search
  USPC .......................................................... 359/280
  See application file for complete search history.

(56) References Cited

U.S. PATENT DOCUMENTS

| | | | | |
|---|---|---|---|---|
| 5,812,304 | A | * | 9/1998 | Shirasaki .................. G02F 1/09 359/324 |
| 5,867,300 | A | * | 2/1999 | Onaka ........................ G02F 1/09 359/324 |
| 2009/0231701 | A1 | | 9/2009 | Hua |
| 2010/0067130 | A1 | | 3/2010 | Kim et al. |

FOREIGN PATENT DOCUMENTS

| | | | | |
|---|---|---|---|---|
| JP | H1164808 | A | * | 3/1999 |
| JP | 2003121787 | A | * | 4/2003 |
| JP | WO2004029698 | A1 | * | 1/2006 |

\* cited by examiner

GLUE FREE FARADAY ISOLATOR

CROSS-REFERENCE TO RELATED APPLICATIONS

This application is the National Stage of International Application No. PCT/US17/32615, filed May 15, 2017. The contents of this prior application are incorporated by reference herein in their entirety.

FIELD OF THE INVENTION

The present invention relates to an optical device, and more particularly, is related to attachments of optical components to an optical device.

BACKGROUND OF THE INVENTION

A Faraday isolator is an optical isolator that transmits light in a certain direction while blocking light in the opposite direction. Faraday isolators are generally based on Faraday rotators that impart a magneto optical effect upon light transmitted through them.

Figure 1:
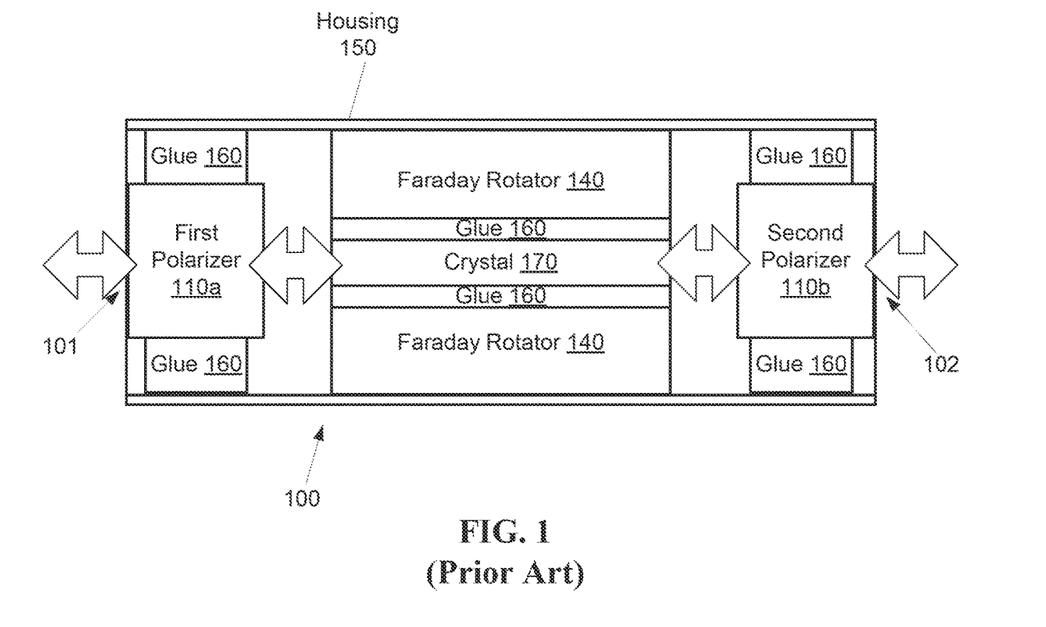
FIG. 1 is a schematic diagram of a prior art Faraday isolator where the optical components are glued to a housing.

Faraday isolators are often used in laser systems, for example, as described by EPO patent application number EP 1660931 B1 entitled "Faradayrotator." As shown by FIG. 1, a Faraday isolator 100 generally consists of a magnet system, such as a Faraday rotator 140, a magneto optical material, and/or polarizers 110a, 110b. A housing 150 has a first optical portal 101 adjacent to the first polarizer 110a at a first end, and a second optical portal 102 adjacent to the second polarizer 110b at a second end, with the Faraday rotator 140 disposed between the first polarizer 110a and the second polarizer 110b. The magneto optical material and/or the polarizers 110a, 110b are secured with glue 160 into the housing 150 or a holder to fix their positions relative to the Faraday rotator 140 and to prevent mechanical stress. Similarly, a crystal 170 disposed within the Faraday rotator 140 may be affixed to the Faraday rotator 140 with glue. However, applying the glue 160 adds an additional manufacturing step, and the glue can fail under certain conditions, for example, under certain temperature conditions, or when exposed to corrosive agents. Further, in optical systems it is desirable to avoid outgassing materials, such as the glue 160, as outgassing materials may cause contamination of optical components. These contaminations may damage the systems or shorten lifetimes of the systems.

An outgassing Faraday isolator may cause contamination of any optical components in the laser and therefore worsen performance or diminish the lifetime of the laser. This is especially true for ultraviolet (UV) lasers and/or high power lasers. Therefore, there is a need in the industry to address one or more of these shortcomings.

SUMMARY OF THE INVENTION

Embodiments of the present invention provide a glue free Faraday isolator. Briefly described, the present invention is directed to a glueless optical device includes a housing having a first optical portal and a second optical portal opposite the first optical portal. A first optical component is within the housing adjacent to the first optical portal, and a second optical component is within the housing adjacent to the second optical portal. A central optical component is positioned within the housing between the first optical component and the second optical component. A first holder is configured to mount the first optical component to the housing via a first plate spring, and a second holder is configured to mount the second optical component to the housing via a second plate spring. A construct having a tubular spring, for example, a coil spring engaging a cylindrical crystal, is configured to pass through a bore hole in the central optical component and mount the central optical component between the first holder and the second holder.

Other systems, methods and features of the present invention will be or become apparent to one having ordinary skill in the art upon examining the following drawings and detailed description. It is intended that all such additional systems, methods, and features be included in this description, be within the scope of the present invention and protected by the accompanying claims.

BRIEF DESCRIPTION OF THE DRAWINGS

The accompanying drawings are included to provide a further understanding of the invention, and are incorporated in and constitute a part of this specification. The components in the drawings are not necessarily to scale, emphasis instead being placed upon clearly illustrating the principles of the present invention. The drawings illustrate embodiments of the invention and, together with the description, serve to explain the principles of the invention.

DETAILED DESCRIPTION

The following definitions are useful for interpreting terms applied to features of the embodiments disclosed herein, and are meant only to define elements within the disclosure.

As used within this disclosure, an "optical component," refers to an object that receives electromagnetic radiation as an input and conveys the received electromagnetic radiation with generally one or more modified characteristic as output, for example but not limited to, a lens, a filter, a polarizer, a collimator, and a magneto optical crystal.

As used within this disclosure, a "plate spring," or a "flat spring," refers to a sheet of material, typically metal, for example, steel, having flexibility, compressibility, and deformability qualities determined, for example by the thickness and width of the material, rather than the shape of the spring as configured. For example, a flat spring may be formed of a planar piece of metal that is shaped, for example by cutting, bending, punching holes, into a form where the spring is conformed to interact in a desirable manner with another object.

As used within this disclosure, a "mechanical fastener" or "mechanical attachment" refers to a non-adhesive means for attaching a first object to a second device, for example, a clip, a clamp, a screw, a bolt, a friction fit, a tab-in-slot, a peg, a hook and loop fastener. A mechanical fastener/attachment explicitly excludes glue and other chemical adhesives, or other adhesives that may result in decay and/or deterioration resulting in outgassing from the adhesive material.

As used within this disclosure, "substantially" means "very nearly," or to within normal manufacturing tolerances as recognized by a person having ordinary skill in the art. The term is used to allow for a reasonable amount of variation within tolerances expected in the field of use of the invention.

As used within this disclosure, "light" refers to electromagnetic radiation, including visible light and non-visible light, for example but not limited to, ultraviolet (UV) light and infrared (IR) light.

Reference will now be made in detail to embodiments of the present invention, examples of which are illustrated in the accompanying drawings. Wherever possible, the same reference numbers are used in the drawings and the description to refer to the same or like parts. Embodiments of the present invention include a glue free Faraday isolator including magneto optical material and polarizers, both affixed within a housing by mechanical means, for example, via springs, instead of glue.

Figure 2:
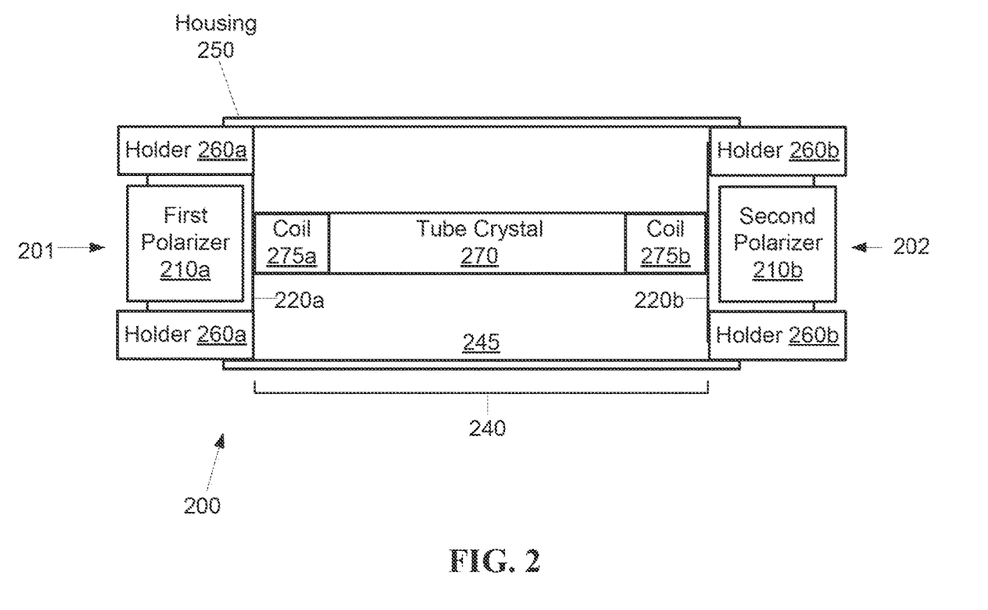
FIG. 2 is a schematic diagram of an exemplary embodiment of a Faraday isolator according to the present invention.

As shown by FIG. 2, under a first embodiment of the present invention a Faraday isolator 200 generally consists of a primary optical component 240, for example, a magnetic optical system, such as a Faraday rotator, a first polarizer 210a, and a second polarizer 210b. A housing 250 has a first optical portal 201 located adjacent to the first polarizer 210a at a first end of the housing 250, and a second optical portal 202 located adjacent to the second polarizer 210b at a second end of the housing 250, with the primary optical component 240 disposed between the first polarizer 210a and the second polarizer 210b.

The embodiments described herein may have a symmetry of elements at opposite ends of the device, for example, the first polarizer 210a disposed at the light ingress end of the Faraday isolator 200, and the second polarizer 210b disposed at the light egress end of the Faraday isolator 200. The first and second polarizers 210a, 210b will be referred to collectively herein as the polarizers 210, or referred to generically as a polarizer 210. Other components having input/output pairs will be referred to herein in a similar manner.

Figure 3A:
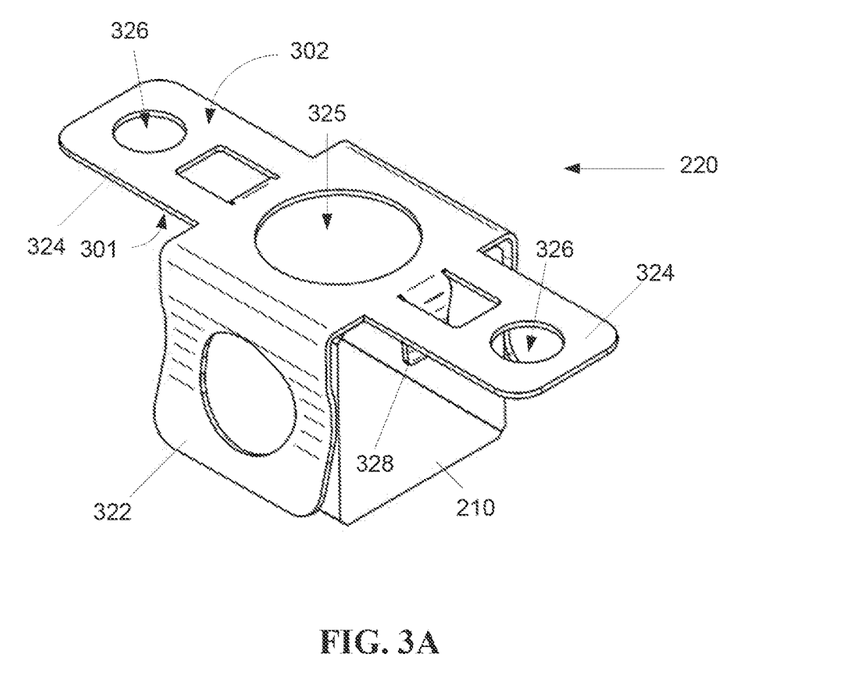
FIG. 3A is a schematic diagram showing the plate spring of FIG. 2 holding a polarizer from an angled perspective.
Figure 3B:
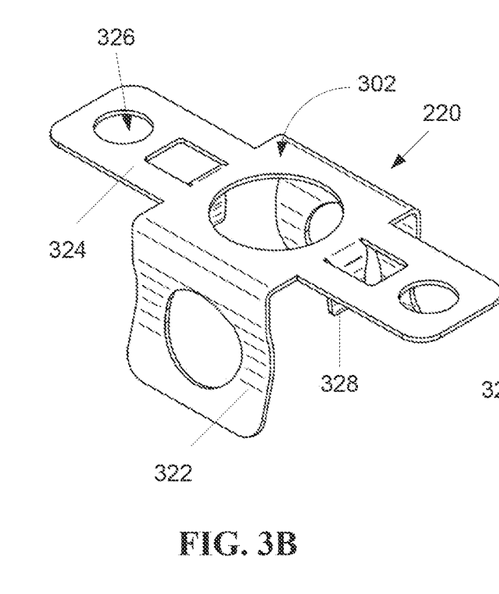
FIG. 3B is a schematic diagram showing the plate spring of FIG. 2 from a top angled perspective.
Figure 3C:
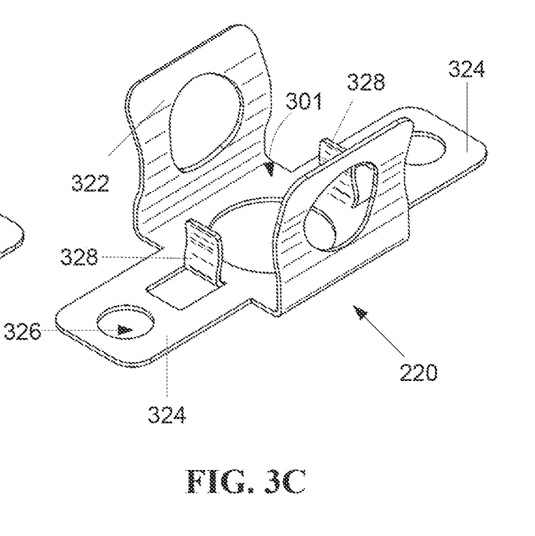
FIG. 3C is a schematic diagram showing the plate spring of FIG. 2 from a bottom angled perspective.

The polarizers 210, are each secured to the housing 250 and/or a holder 260 by a spring 220 made out of a metal plate, for example, a flat spring or a plate spring, as shown in FIG. 3A. It is desirable that the spring 220 apply sufficient pressure to the polarizer 210 to securely hold the polarizer 210 in place without applying excessive force that may damage the polarizer 210 or introduce stress birefringence to the polarizer. As shown in FIG. 3A, the spring 220 may be formed from a flat spring material that is cut and bent to accommodate the polarizer 210. A side adjacent to the polarizer 210 is referred to herein as the interior side 301, while a side opposite the interior side 301 is referred to herein as the exterior side 302.

Two or more clamp portions 322 of the spring 220 may be bent inward toward the polarizer 210, such that the interior side 301 of the clamp portions contact and exert a spring force upon the polarizer 210, holding the polarizer 210 in place. A through port 325 may be formed in the spring 220 passing between the interior sided 301 and the exterior side 302 by removing a portion of the spring 220 to provide a window for light to pass through the spring to and/or from the polarizer 210. While the through port 325 is depicted as circular in shape, other shapes for the through port 325 may be chosen to suit the application, for example, but not limited to, a square window. Similarly, the through port 325 may be divided into two or more sections or portals. The through port 325 may be configured to accommodate another optical component (not shown), for example but not limited to, a lens or a filter.

Figure 3D:
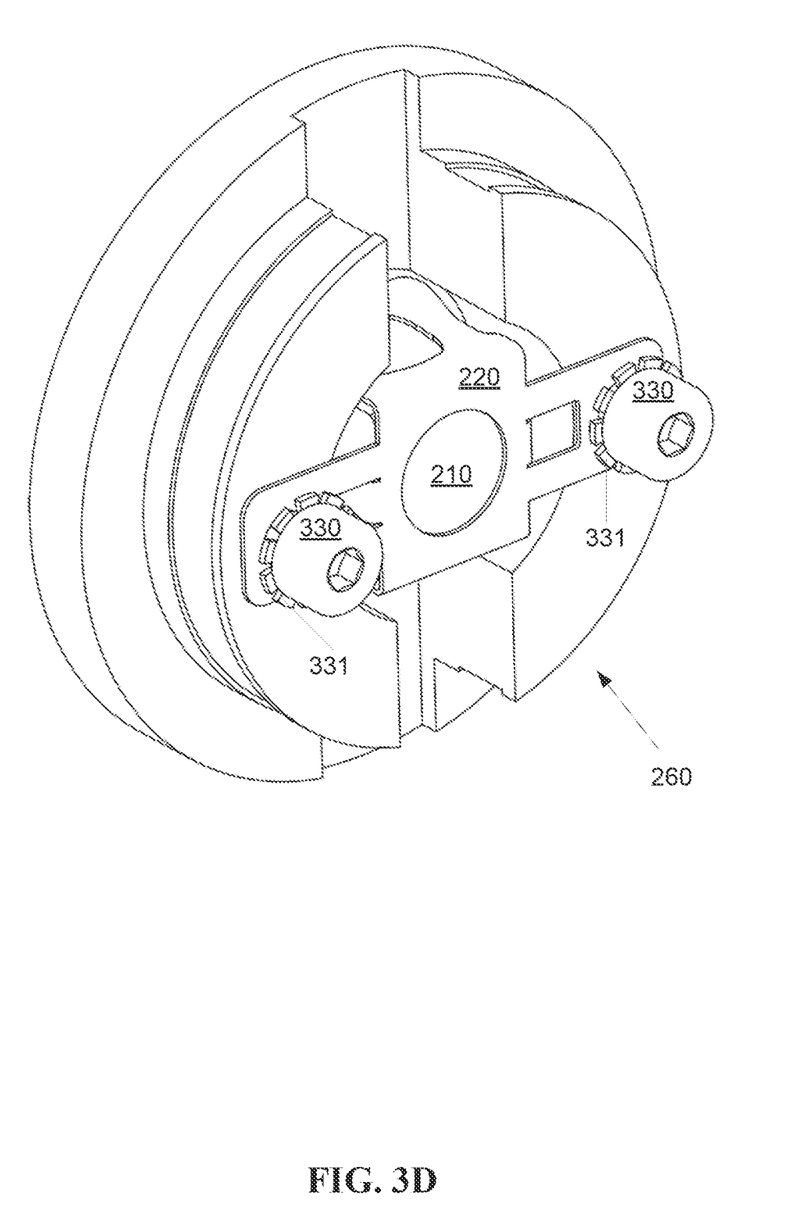
FIG. 3D is a schematic diagram showing the plate spring of FIG. 2 as attached to a holder.

Two wing portions 324 of the spring 220 may extend outward from the through port 325. The wing portions 324 may be used to fasten the spring 220 to another component of an optical device, for example, a holder 260 (FIG. 3D). The wing portions 324 may include fastening means, for example, screw holes 326. Two or more positioning tabs 328 may be formed by partially cutting sections of the wing portions 324 and bending them inward toward the interior side 301 of the spring 220 to position and at least partially hold the polarizer 210 in place.

Under the first embodiment, the polarizers 210 are configured in a cube shaped arrangement. However, in alternative embodiments one or more of the polarizers 210 may be configured in other ways, for example, in a cylindrical (or cuboid) configuration, or other shapes, and the spring 220 may be adapted accordingly to receive and secure the configuration of the polarizer 210.

The spring 220 is preferably formed from a material, for example 1.4310=X10CrNi18-8=AISI/ASTM/UNS 301, configured to exert sufficient pressure upon the polarizer 210 without affecting the optical properties of the polarizer 210, and to securely maintain the polarizer 210 across a functional range of temperatures, where the polarizer 210 may expand and/or contract accordingly without resulting in excessive force upon the polarizer 210, or insufficient force upon the polarizer 210, for example, where the polarizer 210 is no longer secured by the spring 220.

The spring 220 may be attached to the holder 260 (FIG. 3D) or to the housing 250 (FIG. 2) itself such that the interior side 301 of the spring 220 is attached adjacent to the polarizer holder 260 (FIG. 3D), for example, with screws 330 (FIG. 3D) passing through the screw holes 326 (FIG. 3A) to secure the spring 220 to the holder 260 via the screw holes 326 that may accommodate screws 330 or other attachment means. The screws 330 may be further secured using other fastening means, for example, washers 331. Alternatively, the spring 220 may be attached to the holder 260 such that the exterior side 302 of the spring 220 is attached adjacent to the polarizer holder 260.

Figure 5A:
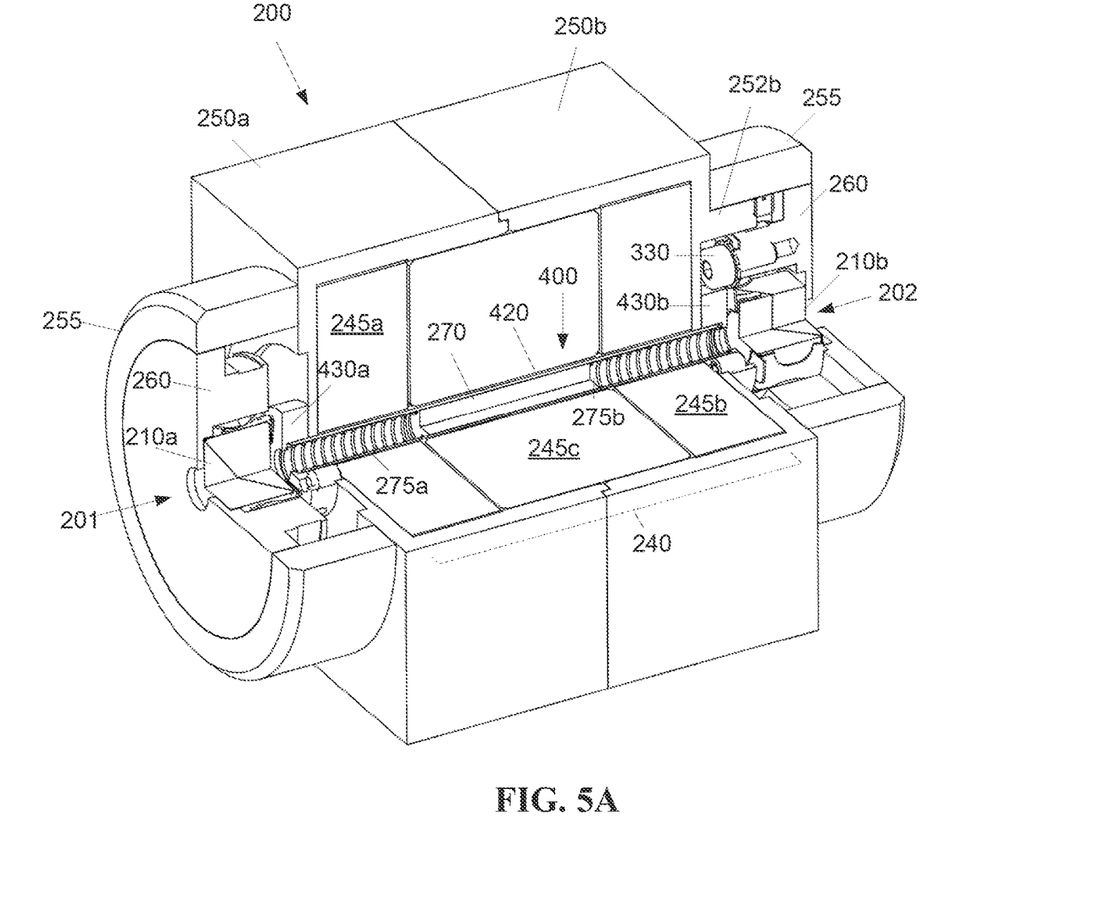
FIG. 5A is a cutaway schematic diagram of an exemplary embodiment of a Faraday isolator.

The polarizer holder 260 may be configured to physically conform to the housing 250, for example having an exterior profile shape matching an interior profile shape of the housing 250 or a beam protection ring 255 (FIG. 5A). The polarizer holder 260 may be mechanically attached to the housing 250 (FIG. 2) and/or the beam protection ring 255 (FIG. 5A), for example, via a screw (not shown) or a friction mount. The beam protection rings 255 (FIG. 5A) may be attached to the housing 250, for example, with a fastening mechanism such as pin or screw 257 (FIG. 5B) disposed through a through hole 256 (FIG. 5B) in the beam protection rings 255, and affixed to an extending flange portion 252 (FIGS. 5A-B) of the housing 250. Similarly, the extending flange portions 252 (FIGS. 5A-B) may be used to attach the polarizer holder 260 to the housing 250, for example, by a screw 253 (FIG. 5B) through a through hole 254 (FIG. 5B) in the extending flange portions 252 (FIGS. 5A-B) exerting pressure on the polarizer holder 260.

When compared to transmission via polarizers 210 without any mounting, the extinction and transmission of characteristics of the polarizers 210 mounted as per the first embodiment yield no measurable differences, indicating spring 220/holder 260 combination does not induce significant stress to the polarizer 210.

Figure 4:
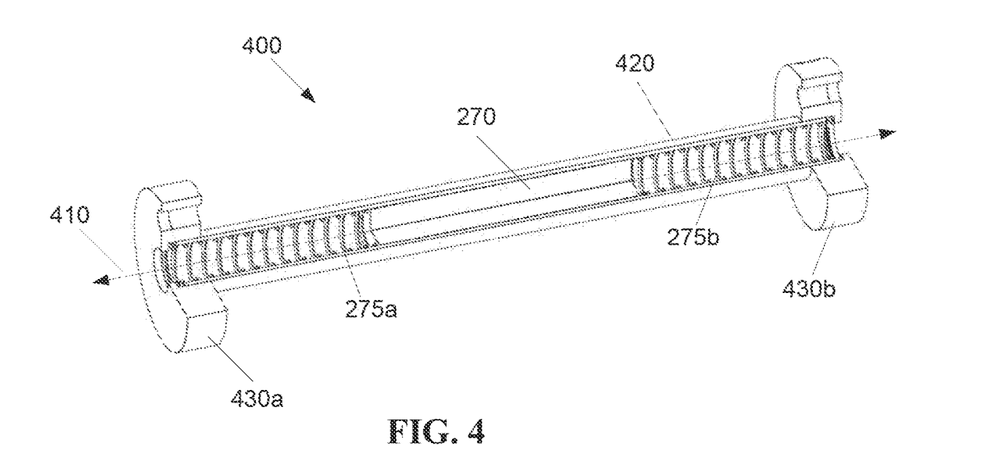
FIG. 4 is a schematic diagram showing an isolated detail of the optical rod and coil spring assembly of FIG. 2.

As shown in FIG. 4, a crystal support construct 400 includes a cylindrically shaped crystal 270, referred to herein as a tube crystal 270, and one or two tubular springs, for example, coil springs 275a, 275b. The tube crystal 270 serves as a light conduit between the first polarizer 210a (FIGS. 5A-B) and the second polarizer 210b (FIGS. 5A-B), via an axial optical pathway 410. The tube crystal 270 may be positioned within an axial bore hole 242 (FIG. 5B) passing through the magnetics 245a-c (FIG. 5A) of the primary optical component 240 (FIG. 5A). The tube crystal 270 and coil springs 275 may be located within a tubular housing 420, and contained therein by two end caps 430a, 430b. The optical pathway 410 passes through a first end cap 430a, through an axial gap in the first coil spring 275a, through the tube crystal 270, through an axial gap in the second coil spring 275b, and through the second end cap 430b.

The first coil spring 275a is disposed at a first end of the tube crystal 270, and may be compressed or partially compressed between the first end cap 430a and the tube crystal 270 after assembly with the second coil spring 275b and the second end cap 430b. Likewise, the second coil spring 275b is disposed at a second end of the tube crystal 270, and may be compressed or partially compressed between the second end cap 430b and the tube crystal 270, positioning the tube crystal 270 substantially at the center of the magnetics 245c (FIG. 5A). Light passing through the tube crystal 270 is affected by the magnetics 245a-c (FIG. 5A). The first end cap 430a may be disposed adjacent to an exterior end portion of a first housing portion 250a (FIG. 5A), and the second end cap 430b may be disposed adjacent to an exterior end portion of a second housing portion 250b (FIG. 5A).

Referring to FIG. 5A, the end caps 430a-b may be fastened to the housing 250 and/or the holders 260 via mechanical means, such as a screw 431 (FIG. 5B), clips, clasps or other fasteners, or may be friction or compression mounted. In alternative embodiments, the end caps 430a-b and the housing 250 may in addition or instead be joined by other mechanical coupling configurations, for example, but not limited to, a threading or locking collar arrangement.

The housing 250, the holders 260, the beam protection rings 255 the tubular housing 420, and the end caps 430a-b are preferably formed of a structurally rigid material that is magnetically neutral, for example but not limited to aluminum or ceramic. The coil springs 275 may be formed of metal, for example, steel springs (1.4310=X10CrNi18-8=AISI/ASTM/UNS 301), or may be formed of a magnetically neutral material, for example, a plastic or ceramic material, provided such material is not prone to outgassing.

Figure 5B:
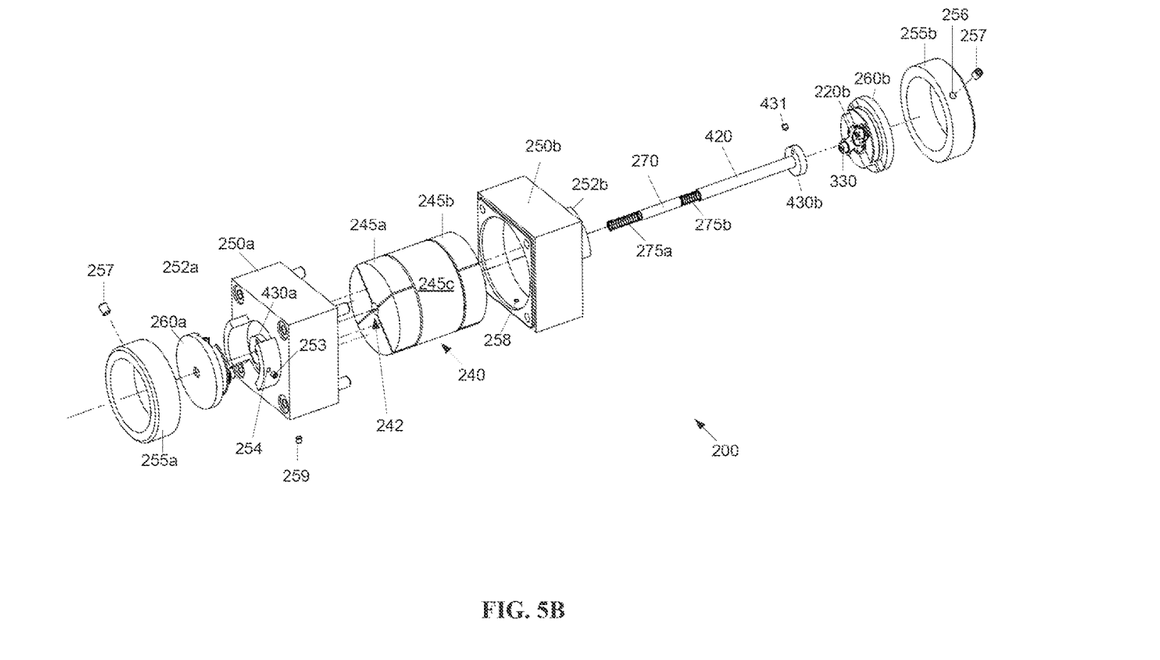
FIG. 5B is a schematic diagram of the Faraday isolator of FIG. 5A in an exploded view.

Referring to FIGS. 5A-B, the primary optical component 240, such as a Faraday rotator, may be located inside the housing 250 between the first polarizer 210a and the second polarizer 210b. The primary optical component 240 may include the crystal support construct 400 (FIG. 4), a first sectional magnetics portion 245a, a second sectional magnetics portion 245b, and a core (third) magnetics portion 245c. The magnetics portions 245a-c may be mechanically contained within a first housing portion 250a and a second housing portion 250b. The primary optical component 240 may be at least partially secured to the housing 250 via one or more screws 259 affixed through one or more through holes 258 in the housing 250.

The crystal support construct 400 ensures that the tube crystal 270 is positioned in the center of the primary optical component 240. It may be desirable for the tube crystal 270 to have tilted end faces, for example, having up to a 1° tilt angle or more with respect to normal from a center axis of the crystal. An advantage of the coil springs 275 over other means for supporting the tube crystal 270 is that the coil springs 275 structurally adapt to this tilt angle.

The crystal support construct 400 including the tube crystal 270 and springs 275 may flexibly support the tube crystal 270 within the magnetics 245a-c between the polarizers 210 such that the tube crystal 270 may expand or contract slightly within the magnetics 245 of the primary optical component 240, for example due to temperature changes, while still being correctly functionally positioned within the Faraday rotator magnetics 245.

Light exiting from the first polarizer 210a is conveyed through the primary optical component 240 to the second polarizer 210b. Specifically, light, for example, laser light, is received through a first optical portal 201 by the first polarizer 210a. The tube crystal 270 located within the axial bore hole 242 of the core magnetics portion 245c receives polarized light from the first polarizer 210a via a gap (or through channel) within the first coil spring portion 275a. Similarly, light exiting the tube crystal passes through a gap/channel in the second coil spring 275b to the second polarizer 210b.

Figure 6:
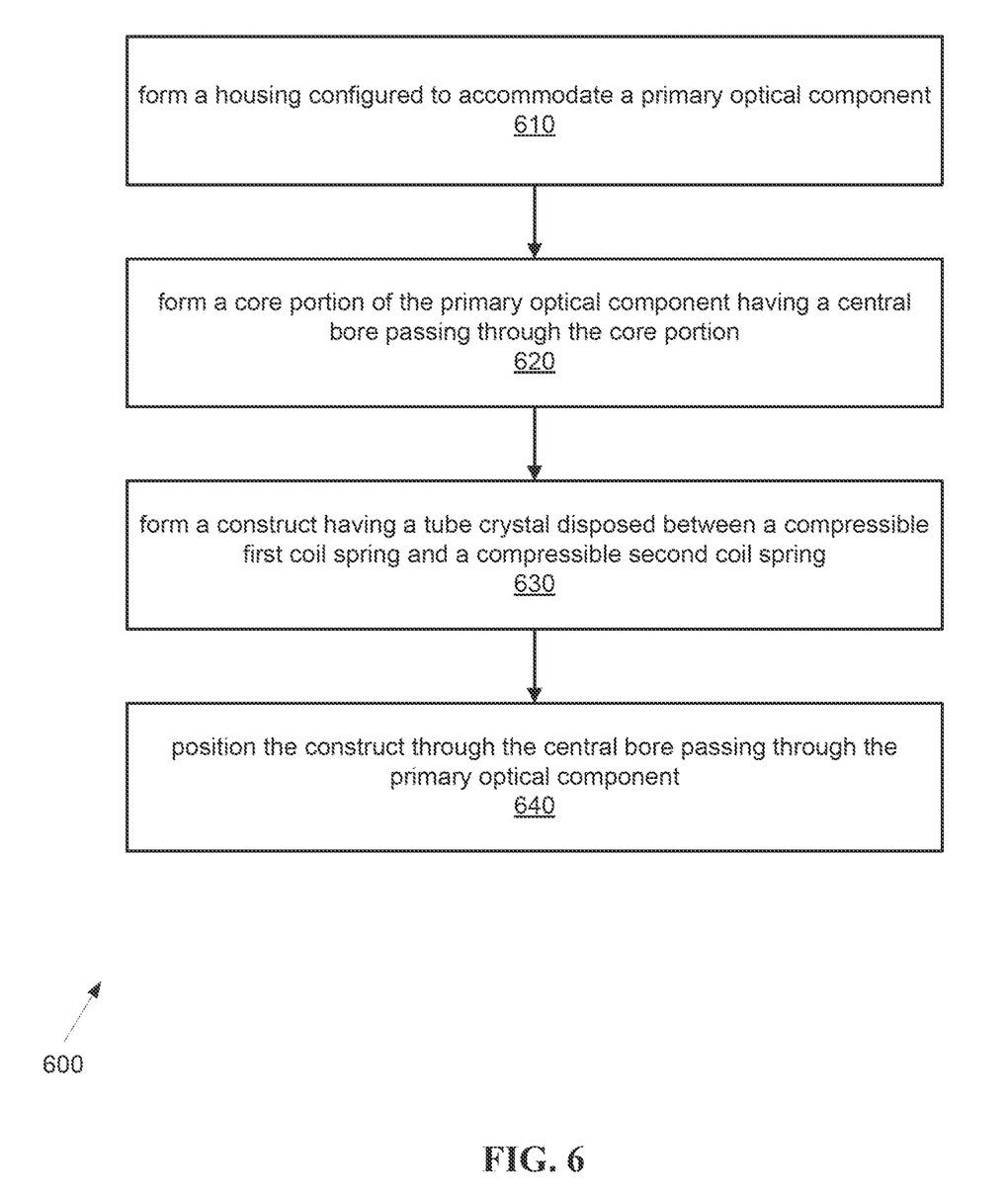
FIG. 6 is a flowchart of an exemplary method for manufacturing an optical device having an optical component.

FIG. 6 is a flowchart of an exemplary first method 600 for manufacturing an optical device having an optical component. It should be noted that any process descriptions or blocks in flowcharts should be understood as representing modules, segments, portions of code, or steps that include one or more instructions for implementing specific logical functions in the process, and alternative implementations are included within the scope of the present invention in which functions may be executed out of order from that shown or discussed, including substantially concurrently or in reverse order, depending on the functionality involved, as would be understood by those reasonably skilled in the art of the present invention. The method is described with reference to the elements shown in FIGS. 5A-B.

A housing 250 (formed by a first housing portion 250a and a second housing portion 250b) configured to accommodate a primary optical component 240, for example an magnetic optical device such as Faraday rotator, is formed as shown by block 610. The interior of the housing 250 may be shaped to receive and contain the primary optical component 240. For example, magnetic portions of the primary optical component 240 may be arranged such that two or more portions repel one another by magnetic force, and the housing 250 may be configured to hold such repelling portions of the primary optical component 240 in place. A core portion 245*c* of the primary optical component 240 including an axial bore hole 242 passing through the core portion 245*c* is formed, as shown by block 620. For example the core portion 245*c* may include magnetics for the primary optical system 240, for example, a Faraday rotator. A construct 400 having a tube crystal 270 disposed between a first coil spring 275*a* and a second coil spring 245*b* is formed, as shown by block 630. The first coil spring 275*a* and/or the second coil spring 245*b* may be partially compressed when assembled with other components.

The tube crystal 270 may be generally cylindrically shaped, with substantially flat end portions configured at a small angle with respect to normal of the axial optical pathway 410 (FIG. 4) of the tube crystal 270. The angle may be helpful to prevent or divert back reflections off of the surface of the tube crystal 270 back to the laser, and the angle may be, for example an angle in the range of 0° to 5°, preferably on the order of 1°. While an angle larger than 5° may be used, increasing the size of the angle reduces the effective through transmission of the laser beam, resulting in clipping of the beam, possibly resulting in a reduction of the useable beam aperture.

The construct 400 is positioned within the axial bore hole 242 passing through the primary optical component 240, as shown by block 640.

Figure 7:
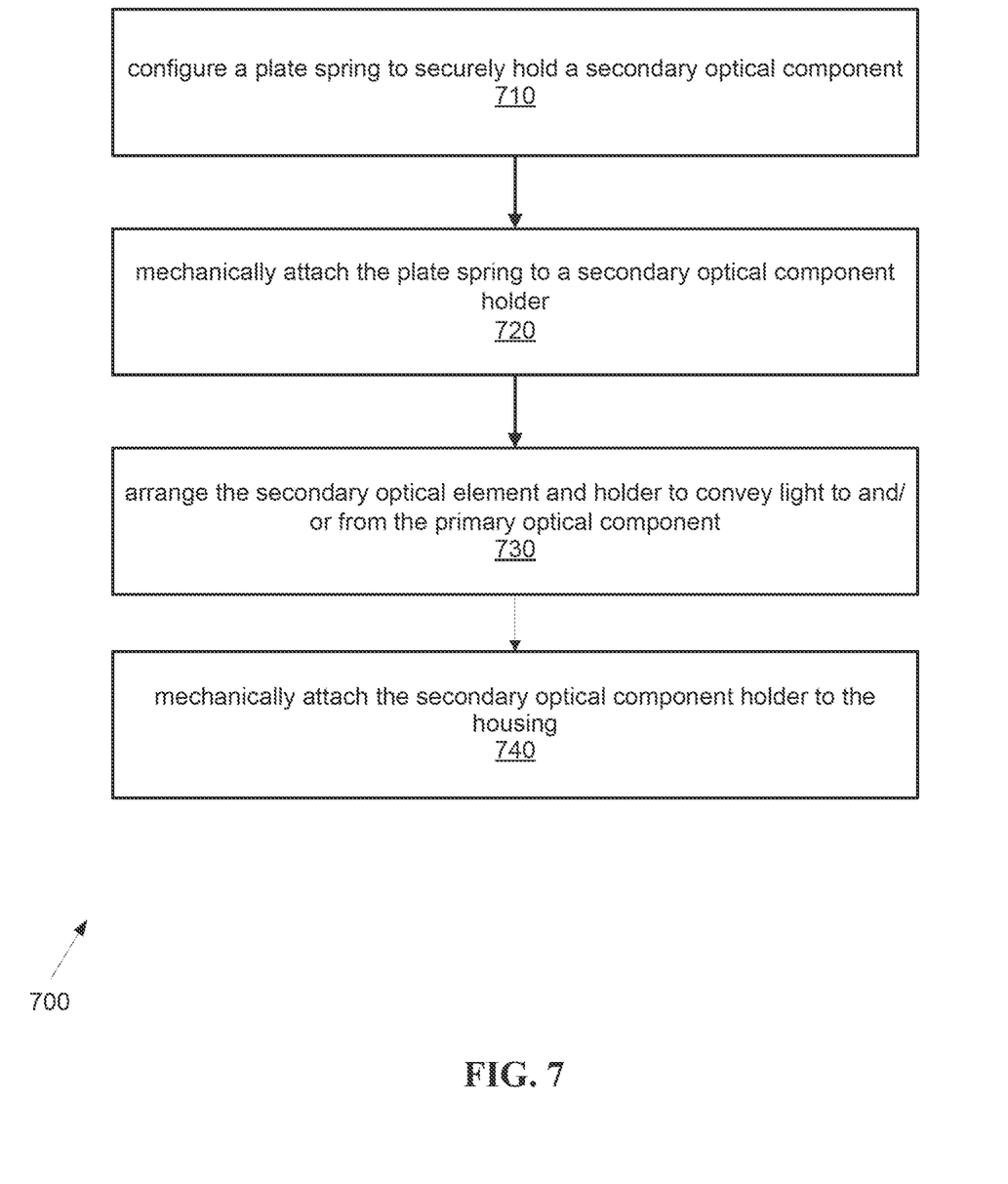
FIG. 7 is a flowchart of an exemplary second method for manufacturing an optical device having an optical component, and may be viewed as a continuation of the method shown in FIG. 6.

FIG. 7 is a flowchart of an exemplary second method 700 for manufacturing an optical device having an optical component. The blocks shown in FIG. 7 may be viewed as a continuation of the method of FIG. 6. A plate spring 220 (FIG. 2) is configured to securely hold a secondary optical component, for example, a polarizer 210, as shown by block 710. For example, the plate spring 220 (FIG. 2) may be cut and/or bent to accommodate the secondary optical component 210. The plate spring 220 (FIG. 2) is mechanically attached to an optical component holder 260, for example, via a mechanical fastener such as a screw connector 330 (FIG. 3A), as shown by block 720. The secondary optical component 210 and holder 260 may be arranged to convey light to and/or from the primary optical component 240, as shown by block 730. The secondary optical component holder 260 is mechanically attached to the housing 250 for example, via a friction attachment, a threading arrangement, or a with a fastener, such as a screw, or by magnetic force as shown by block 720.

While the embodiments described here generally refer to a Faraday isolator, persons having ordinary skill in the art will recognize this invention may be applied to other types of devices where outgassing of glue may have detrimental effects, for example, faraday rotators, pockel cells, laser modulators, optical parametric oscillators, and diode lasers, among others. Further, alternative embodiments of the system may have only one polarizer 210, or may omit the polarizer 210 entirely.

The above described embodiments address an increasing demand on low outgassing Faraday isolators, for example, for UV or high power applications. In addition to reduction of outgassing, manufacture of the embodiments may be more efficient, for example, for handling and cleaning or for reassembling of the mechanical parts for low outgassing applications.

In the above embodiments, the tubular springs have been implemented as coil springs, having a circular shaped cross section, or another shape of cross-section, for example, a square cross section, which may correspond to the shape of a cross section of the tube crystal 270, for example, a square cross section. However, other tubular spring arrangements are also possible, for example, a compressible tubular (cylindrical shaped) sleeve with a through-bore for conveying light may be formed of a compressible material, provided the material is not prone to outgassing.

Figure 8:
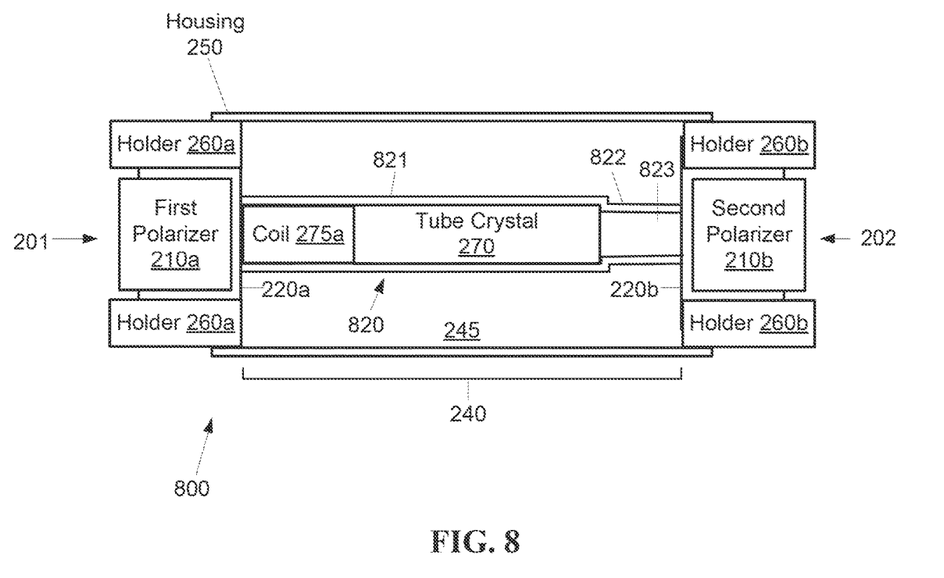
FIG. 8 is a schematic diagram of an exemplary second embodiment of a Faraday isolator according to the present invention.

While the above embodiment includes a crystal mounted by two coil springs, other configurations are possible. For example, as shown in FIG. 8, a second embodiment 800 similar to the first embodiment of the Faraday isolator 200 may only use one coil spring 275*a* at one side of the tube crystal 270 within a wide diameter portion 821 of a multi diameter tubular housing 820 and use a small diameter portion 822 of the multi diameter tubular housing 820 on the side of the tube crystal 270 opposite the coil spring 275*a* as a mechanical stop. In alternative embodiments, other types of mechanical stops may be used. It should be noted that descriptions for elements with element numbers shared by elements described and depicted in other embodiments may be found in the descriptions of the other embodiments.

An interior diameter of the a wide diameter portion 821 of the multi diameter tubular housing 820 is larger than an exterior diameter of the tube crystal 270 to accommodate the tube crystal 270 within the wide diameter portion 821 of the multi diameter tubular housing 820. An interior diameter of the small diameter portion 822 of the multi diameter tubular housing 820 is smaller than the exterior diameter of the tube crystal 270, thereby preventing the tube crystal 270 from entering the small diameter portion 822, and serving to hold one end of the tube crystal 270 within the wide diameter portion 821 of a multi diameter tubular housing 820. An optical pathway passes through the first polarizer 210*a*, an axial gap in the first coil spring 275*a*, the tube crystal 270, an axial gap in the small diameter portion 822 of the multi diameter tubular housing 820, and the second polarizer 210*b*. The interior of the small diameter portion 822 of the multi diameter tubular housing 820 may be empty (a full or partial vacuum or filled with air or other gas), or may be filled with another material, for example, a dielectric material, or another optical component.

Figure 9:
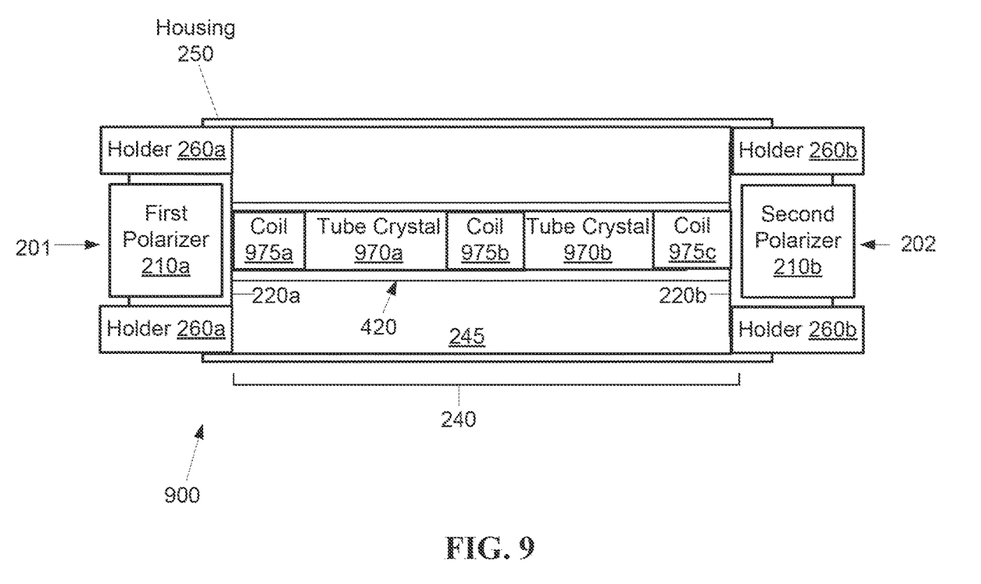
FIG. 9 is a schematic diagram of an exemplary third embodiment of a Faraday isolator according to the present invention.

In other embodiments, more than one crystal may be used one after the other in the optical path, where additional coil springs may be used in the space between adjacent crystals. As shown in FIG. 9, a third embodiment 900 similar to the first embodiment of the Faraday isolator 200 may use a first coil spring 975*a* to support a first end of a first crystal 970*a* within the tubular housing 420, a second coil spring 975*b* to support a second end of the first crystal 970*a* and a first end of a second tube crystal 970*b* within the tubular housing 420 and a use a third coil spring 975*c* to support a second end of the second crystal 970*b*. The second tube crystal 970*b* may have different optical properties than the first crystal 970*a*, or the second tube crystal 970*b* may have the same or similar optical properties as the first crystal 970*a*. An optical pathway passes through the first polarizer 210*a*, an axial gap in the first coil spring 975*a*, the first tube crystal 970*a*, an axial gap in the second coil spring 975*b*, the second tube crystal 970*b*, an axial gap in the third coil spring 975*c*, and the second polarizer 210*b*.

Figure 10:
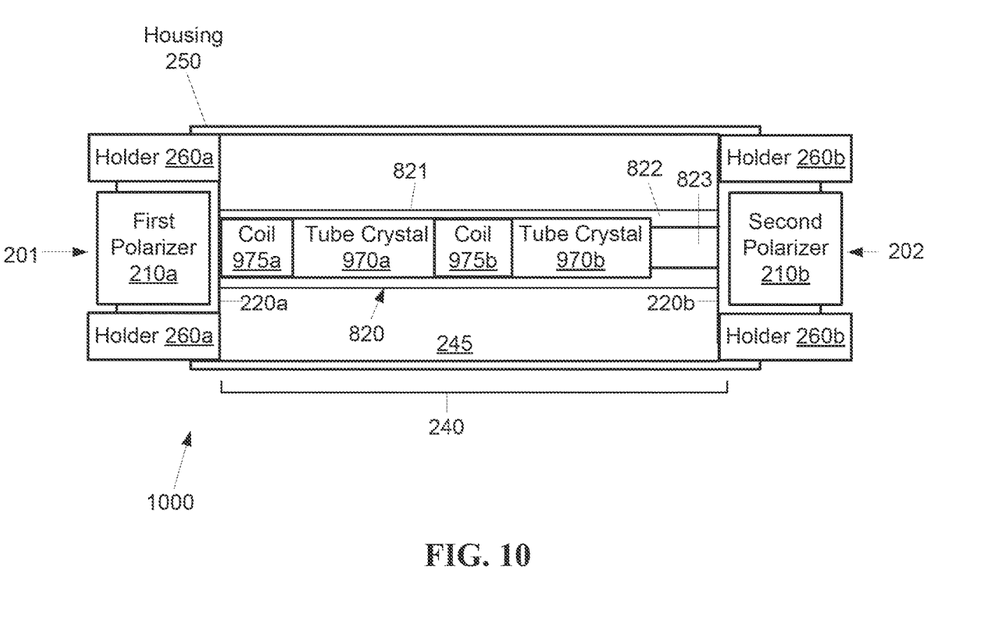
FIG. 10 is a schematic diagram of an exemplary fourth embodiment of a Faraday isolator according to the present invention.

Other combinations of crystals and tube configurations are possible to accommodate different combinations of optical elements. For example, a fourth embodiment may combine embodiments which may have more than one crystal within the tube. As shown in FIG. 10, a fourth embodiment 1000 similar to the third embodiment of the Faraday isolator 800 may use a first coil spring 975*a* to support a first end of a first crystal 970a within the multi diameter tubular housing 820, a second coil spring 975b to support a second end of the first crystal 970a and a second tube crystal 970b within the multi diameter tubular housing 820 and a use a small diameter portion 822 of the multi diameter tubular housing 820 on the side of the crystal 970b opposite the coil spring 975a as a mechanical stop. An optical pathway passes through the first polarizer 210a, an axial gap in the first coil spring 975a, the first tube crystal 970a, an axial gap in the second coil spring 975b, the second tube crystal 970b, an axial gap in the small diameter portion 822 of the multi diameter tubular housing 820, and the second polarizer 210b. The interior 823 of the small diameter portion 822 of the multi diameter tubular housing 820 may be empty (a full or partial vacuum or filled with air/gas), or may be filled with another material, for example, a dielectric material, or another optical component.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A glueless optical device comprising;
   a housing comprising a first optical portal and a second optical portal opposite the first optical portal; and
   a Faraday rotator disposed within the housing, the Faraday rotator comprising a magnetics portion with an axial bore hole through the magnetics portion, the axial bore hole being configured to convey light to and/or from the first optical portal and to and/or from the second optical portal, the Faraday rotator further comprising a construct disposed within the axial bore hole of the magnetics portion, the construct comprising:
      a first tubular spring; and
      an optical crystal disposed between the first tubular spring and the second optical portal,
   wherein the construct is arranged in an optical pathway between the first optical portal and the second optical portal so the optical pathway proceeds through a first axial gap within the first tubular spring and through the optical crystal.

2. The device of claim 1, further comprising a second tubular spring, wherein the first and/or second tubular spring comprises a coil spring, the optical crystal is disposed between first tubular spring and the second tubular spring, and the optical pathway
   proceeds through the first axial gap within the first tubular spring, through the optical crystal, and through a second axial gap within the second tubular spring.

3. The device of claim 1 further comprising an optical component adjacent to the first optical portal configured to convey light to and or from the first optical portal to and/or from the optical crystal.

4. The device of claim 3, further comprising a first plate spring configured to exert pressure on the optical component, wherein the first plate spring is attached to a first holder via a mechanical fastener and the first holder is mechanically attached to the housing.

5. The device of claim 3, wherein the optical component comprises a polarizer.

6. The device of claim 3, further comprising:
   a second optical component adjacent to the second optical portal configured to convey light to and/or from the second optical portal to and/or from the optical crystal; and
   a second holder configured to mount the second optical component to the housing via a second plate spring.

7. The device of claim 6, wherein the second optical component comprises a polarizer.

8. The device of claim 6, wherein the optical component and/or the second optical component has a substantially cube-shaped configuration.

9. The device of claim 1, wherein the optical crystal is configured as a cylindrical crystal.

10. The device of claim 1, wherein a first end surface and/or a second end surface of the optical crystal is configured with a tilt angle greater than 0° with respect to normal of a center axis of the optical crystal.

11. The device of claim 1, further comprising a tubular crystal housing configured to contain the optical crystal and the first tubular spring.

12. The device of claim 1, further comprising a multi diameter tubular crystal housing comprising a first portion having a first interior diameter larger than a second interior diameter of a second portion, wherein the first portion is configured to house the optical crystal and the first tubular spring.

13. A method of forming a glueless optical device, the method comprising;
    forming a housing comprising a first optical portal and a second optical portal opposite the first optical portal; and
    disposing a Faraday rotator within the housing, the Faraday rotator comprising a magnetics portion with an axial bore hole through the magnetics portion, the axial bore hole being configured to convey light to and/or from the first optical portal and to and/or from the second optical portal, the Faraday rotator further comprising a construct disposed within the axial bore hole of the magnetics portion, the construct comprising:
       a first tubular spring; and
       an optical crystal disposed between the first tubular spring and the second optical portal,
    wherein the construct is arranged in an optical pathway between the first optical portal and the second optical portal so the optical pathway proceeds through a first axial gap within the first tubular spring and through the optical crystal.

* * * * *